Figure 1:
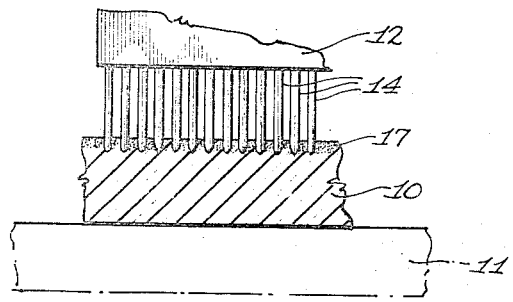

April 11, 1967 R. D. WAUGH 3,313,642

PROCESS OF MODIFYING THE SURFACE PROPERTIES OF POLYOLEFIN FILM

Filed Jan. 17, 1964

INVENTOR
Richard D. Waugh
BY Harold G. Weir
PATENT AGENT

United States Patent Office 3,313,642
Patented Apr. 11, 1967

3,313,642
PROCESS OF MODIFYING THE SURFACE PROPERTIES OF POLYOLEFIN FILM
Richard D. Waugh, Pointe Claire, Quebec, Canada, assignor to Thomas Bonar & Co. (Canada) Limited, Montreal, Quebec, Canada
Filed Jan. 17, 1964, Ser. No. 338,503
7 Claims. (Cl. 117—11)

This invention relates to a process for producing an article from a plastic polyolefin film, and in particular it relates to a process for treating a plastic polyolefin film to make its surface receptive to printing ink while substantially maintaining the heat sealability property of the film.

The term "polyolefin film" as used herein is intended to include polyethylene film, i.e., a film of a solid polymer of ethylene; polypropylene film, i.e., a film of a solid polymer of propylene; plastic films made of solid polymers of other olefins; and plastic films of copolymers of these olefins; where the plastic films are inherently not receptive to printing inks.

Of these polyolefin films, polyethylene and polypropylene are currently used in packaging. Polyethylene film is particularly suitable for making articles such as bags, packages and wrappings because it is generally tough, resistant to many chemicals, exhibits a high degree of impermeability to moisture, permits the passage of oxygen, and is heat sealable. Polypropylene film is very similar and is also very suitable for making bags, packages, etc. It is frequently advantageous to have some form of printing on the polyethylene film or polypropylene film forming the bag, package or other article, but the usual printing inks do not adhere satisfactorily to the surface of such a film.

In order to obtain satisfactory adhesion between a polyethylene or polypropylene film surface and a printing ink, it is known to treat the surface of the film in various ways. One such surface treatment is a differential heat treatment, sometimes referred to as a flame treatment, and another is a treatment using ozone which is sometimes referred to as an electrical treatment.

In the differential heat treatment or so-called flame treatment, a source of heat which may be a direct flame, a heating element, hot air or the like, is used to raise the temperature of a surface of the plastic polyethylene or polypropylene film to its softening point or to its melting point while keeping the remainder of the film below the softening point. This is normally done by heating the one surface and cooling the opposite surface. A layer of the plastic material adjacent the surface is thereby modified to render it receptive to printing ink. However, other properties of the polyethylene or polypropylene are also affected by the treatment. For example, the treated surface layer reduces the heat sealability property of these plastic films.

The aforementioned treatment using ozone is sometimes referred to as an electrical treatment because the ozone is normally generated electrically. In this known treatment, a polyethylene or polypropylene surface is exposed to a gaseous atmosphere containing at least 0.01% by volume of ozone and an amount, not in excess of the volume percent of ozone present, of a gaseous accelerator agent selected from the group consisting of the halogens and the hydrogen halides, at a temperature within the range of from room temperature to the temperature beyond which substantial degradation of the film occurs. This renders the polyethylene or polypropylene surface so exposed adherent to printing ink. It also has the effect of reducing the heat sealability property of the polyethylene or polypropylene.

Thus, both the flame treatment and electrical treatment alter the surface properties of the polyethylene or polypropylene film, or other structure treated, and promote the adhesion of printing ink. While these treatments both modify a surface layer of polyethylene or polypropylene to make it receptive to printing ink, they have an adverse effect on the sealing properties of the plastic materials. The minimum fusion temperature, that is the minimum temperature at which fusion occurs between adjacent surfaces of polyethylene or polypropylene film, is increased by flame or electrical treatment by an amount depending on the degree of the treatment. With the increase in the minimum fusion temperature there is a corresponding decrease in the strength of a seal made with the treated polyethylene or polypropylene. Consequently, a balance must be obtained in the treating process so that good ink adhesion results without decreasing sealability to a point where the film cannot be sealed or without decreasing the resulting seal strength to an unacceptable level.

It would, of course, be desirable to restore at least to some degree the sealability property of a polyethylene film or of a polypropylene film or of any other similar polyolefin films after its surface has been treated to make it receptive to printing ink. Considerable amounts of time and money have been spent to achieve such a restoration of sealability. Attempts have been made to raise the minimum fusion temperature and thus improve the heat sealability property or treated plastic film by applying various chemical and/or heat treatments to the film. These attempts have not been satisfactory. Either the attempts involve expensive and complex treatments or they do not result in an adequate improvement in heat sealability.

The present invention overcomes disadvantages in the prior processes by providing an inexpensive, direct and simple process for substantially restoring the heat sealability property of polyethylene, polypropylene, or other similar polyolefin film after it has been surface treated to make it receptive to printing ink.

It is an object of the present invention to overcome disadvantages in the prior art by providing an inexpensive, direct and simple process for substantially restoring the heat sealability property of polyolefin films after the films have been surface treated to make them receptive to printing ink.

Figure 2:
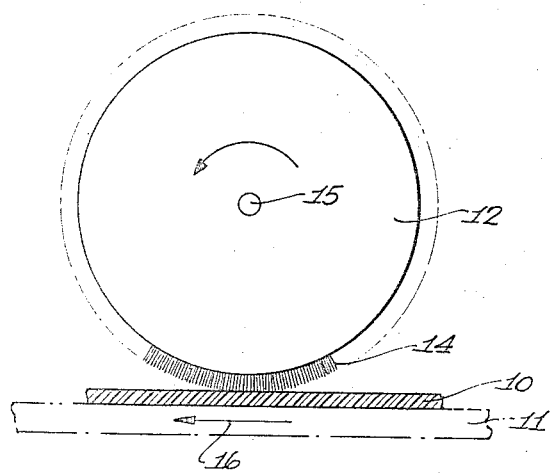

Other objects and advantages of the invention will appear from the following description taken in conjunction with the accompanying drawings in which:

FIGURE 1 is a greatly enlarged sectional view showing schematically a portion of a polyethylene film and a brush engaging it, and FIGURE 2 is a side view, partly in section, showing apparatus arranged for restoring substantially the sealability of treated film in accordance with one embodiment of the invention.

Briefly, the present invention is for a process for producing an article from a polyolefin film which comprises the steps of treating the surface of the film to provide a layer of modified polyolefin on the surface receptive to printing ink but of reduced heat sealability property, and brushing said layer to remove a portion thereof and to substantially restore said heat sealability property.

It has been found that with the present invention the heat sealability property of polyethylene, polypropylene or other similar polyolefin film may be restored up to within 5 to 10 percent of the sealability before flame or electrical treatment.

Referring now to the drawings, the number 10 designates a polyethylene, polypropylene or like plastic film known in the art and shown to an enlarged scale in the drawings. The film 10 is supported on a table 11 which may be a moving table or conveyor. A wire brush 12 of a generally cylindrical configuration has fine wire bristles 14 on its periphery. The brush 12 is mounted for rotation about a shaft 15. The shaft 15 is preferably also mounted for vertical movement towards and away from table 11 so that the bristles 14 are in a position to engage the surface of film 10 by a controllable amount or the bristles are in a position to clear the surface of film 10. The table 11 is mounted for longitudinal movements as indicated by arrow 16 to move film 10 past the brush 12. The direction of movement of the film past the brush is preferably opposite the direction of movement of the bristles 14 where they engage the film as shown in FIGURE 2. Regardless of the relative directions of movement of brush periphery and film surface, for best results there should be a differential of at least 50 ft. per minute between the peripheral brush speed and the linear film speed.

Alternately to the mounting of the brush for vertical movement, the table 11 may be arranged to move vertically to bring film 10 into and out of engagement with the brush. Also, instead of the table 10 moving in a longitudinal direction, the same effect may be achieved by movement of the brush while the table is stationary.

In the greatly enlarged view of FIGURE 1, a surface portion or layer 17 of film 10 is indicated. This layer 17 represents the surface modified by flame or electrical treatment of the film 10 to promote ink adhesion. As was previously discussed, this surface layer 17 adversely affects the property of heat sealability of the film. When the present invention is used to restore substantially the heat sealability of the film, the film is passed under the rotating wire brush which is positioned so that the bristles engage the surface layer 17. Only one row of bristles is shown in FIGURE 1 for simplicity of drawing. The bristles 14 engage the layer 17 and remove a portion of the layer.

It should be noted that it is not necessary that the bristles abrade or remove the layer 17 entirely. Only portions of layer 17 need be removed to obtain an increase in the heat sealability property. While the theory is not known, it is believed that the bristles 14 make spaced abrasions, that is the bristles remove spaced portions, which extend through the layer 17 for the most efficient restoration of heat sealability.

The wire brush 12 may be applied right across the surface of film having a modified layer which has printing ink adhered thereto. Although the slight abrading action of the brush may be detectable on close inspection, it will not mar the printing for normal use if a fine brush is used. In other words, the printing remains easily legible and the heat sealability is substantially restored. Of course, the brush may be raised, if desired, when an area bearing printing approaches the region of engagement of brush and film.

It has been found that satisfactory results have been achieved on a treated film by using a wire brush of about 2¾ inches in diameter with wires or "bristles" about ½ inch long and about 0.005 inch in diameter. The wires in the brush are preferably arranged to give a maximum density on the surface and peripheral brush speeds of 285 ft./minute are suitable. Many other sizes of brush and bristle, and other brush speeds have been found to be satisfactory. The preceding values are in no way critical and are given by way of example only. Satisfactory values are easily found in practice.

It is possible to use brushes or the like which have bristles of material other than materials normally referred to as "wire," as long as they cause a fine abrading action of the modified surface layer. The same action could also be obtained with a very fine sandpaper material, however the spaces between the grit in sandpaper tend to fill with abraded material and consequently a brush is more satisfactory.

The film may be brushed on one side as shown or on both sides, wherever such action is required.

It will be seen that the process of the present invention overcomes a problem on which considerable time and money has been expended. It overcomes this problem in a simple, inexpensive and direct manner. It provides a substantial restoration of the property of heat sealability of a polyolefin film whose surface has been modified to make it receptive to printing inks.

I claim:
1. In a process for producing an article from a polyolefin film which has been subjected to a treatment in the group consisting of a differential heat treatment and an electrical treatment to provide on the surface of said film a modified polyolefin layer receptive to printing ink but of reduced heat sealability property, the step comprising abrading said layer to remove a portion thereof and to substantially restore said heat sealability property.

2. In a process for producing an article from a polyolefin film which has been subjected to a treatment in the group consisting of a differential heat treatment and an electrical treatment to provide on the surface of said film a modified polyolefin layer receptive to printing ink but of reduced heat sealability property, the steps comprising rotating a cylindrical fine wire brush about its axis, and moving said film past the brush with the wire bristles of said brush engaging said layer to abrade said layer and remove a portion thereof to substantially restore said heat sealability property.

3. A process as defined in claim 2 in which the film is moved in a direction opposite the direction of movement of the wire bristles at the region of engagement of the bristles with said layer.

4. A process as defined in claim 2 in which differential in speed between the periphery of the wire brush and the movement of the film past the brush is greater than 50 ft./minute.

5. In a process for producing a plastic article from a sheet of polyolefin film which has been subjected at selected areas thereof to a treatment in the group of treatments consisting of a differential heat treatment and an electrical treatment to provide on the surface of said film at said selected areas a modified polyolefin layer receptive to printing ink but of reduced heat sealability property, the step of lightly abrading selected parts of said areas to remove portions of said layer and to substantially restore said heat sealability property.

6. A process as defined in claim 5, in which the polyolefin film is a polyethylene film.

7. A process as defined in claim 5, in which the polyolefin film is a polypropylene film.

References Cited by the Examiner

UNITED STATES PATENTS

| 2,312,296 | 2/1943 | Hempel | 117—47 |
| 2,536,183 | 1/1951 | Jamieson. | |
| 3,033,703 | 5/1962 | Schneble et al. | 117—47 |
| 3,041,208 | 6/1962 | Hay et al. | 117—138.8 |
| 3,088,844 | 5/1963 | Hungerford et al. | 117—47 |
| 3,227,605 | 1/1966 | Wolinski | 117—47 |

MURRAY KATZ, *Primary Examiner.*